United States Patent [19]

Rütschle

[11] Patent Number: 5,451,196
[45] Date of Patent: Sep. 19, 1995

[54] MACHINE TOOL

[75] Inventor: Eugen Rütschle, Mühlheim, Germany

[73] Assignee: Chiron-Werke GmbH & Co. KG, Germany

[21] Appl. No.: 297,976

[22] Filed: Aug. 29, 1994

[30] Foreign Application Priority Data

Aug. 31, 1993 [DE] Germany .................. 43 29 252.6

[51] Int. Cl.6 .................................... B23Q 3/157
[52] U.S. Cl. .................................. 483/39; 483/36; 483/38
[58] Field of Search ................. 483/30, 36, 38, 39, 483/48, 49, 51, 31, 54, 55, 44

[56] References Cited

U.S. PATENT DOCUMENTS

| | | | |
|---|---|---|---|
| 3,760,490 | 9/1973 | Burg | 483/38 |
| 4,358,888 | 11/1982 | Zankl et al. | 483/54 |
| 4,642,875 | 2/1987 | Rutschle et al. | 483/48 X |
| 4,644,635 | 2/1987 | Murai et al. | 483/54 |
| 4,700,452 | 10/1987 | Babel | 483/38 X |
| 4,716,647 | 1/1988 | Winkler et al. | 483/38 X |
| 4,930,208 | 6/1990 | Winkler et al. | 483/38 X |
| 4,984,351 | 1/1991 | Matsuyama et al. | 483/30 |
| 5,117,552 | 6/1992 | Babel | 483/36 |

FOREIGN PATENT DOCUMENTS

| | | | |
|---|---|---|---|
| 360168 | 3/1990 | European Pat. Off. | 483/38 |
| 6023641 | 2/1994 | Japan | 483/30 |

Primary Examiner—William Briggs
Attorney, Agent, or Firm—Pretty, Schroeder, Brueggemann & Clark

[57] ABSTRACT

A machine tool comprises a travelling column, a spindle stock to be displaced on the travelling column, and a tool magazine. Toolholders are stored in the tool magazine and may be individually conveyed into a transfer position within the tool magazine. Two gripper arms serve to interchange the toolholders between the transfer position on the tool magazine and a working position in the spindle. The orientation of the toolholders during interchanging is maintained. The gripper arms are separately mounted on the spindle head and can be pivoted simultaneously and in opposite directions along locus curves. The gripper arms have grippers to hold the toolholders during the interchanging between the transfer position and the working position. The transfer position and the working position lie in a common vertical plane. The transfer position is located in the area of the travelling column front side facing toward the spindle stock. The tool magazine extends from a rear side of the travelling column through a tunnel in the travelling column to the transfer position. In the area between the positions the locus curves run at a lateral distance from the vertical plane.

11 Claims, 10 Drawing Sheets

MACHINE TOOL

The present invention relates to a machine tool with a traveling column that can be moved along a horizontal main axis; a spindle head, with rotatable spindle, that can be moved on the traveling column along a vertical main axis; a tool magazine in which a plurality of tool holders is stored and can be brought individually into a transfer position; and with two gripper arms to convey the tool holders between the transfer position on the tool magazine and a working position in the spindle while retaining the orientation of the tool holders, such that the gripper arms are separately mounted on the spindle head and can be pivoted simultaneously and in opposite directions along locus curves, with hands to hold the tool holders, between the transfer position and the working position.

A machine tool of the aforesaid type is known from German patent 38 31 869.

In the known machine tool, the transfer position is located above the working position, and in a front view of the machine tool is offset laterally with respect to the working position. The two gripper arms, which are pivot-mounted on opposite sides of the working position, thus have an asymmetrical movement path. Specifically, the gripper arms can be pivoted so as to cross over one another to the common transfer position, and the locus curves run asymmetrically with respect to the working position and thus also asymmetrically with respect to the axis of the spindle head.

German patent 20 13 836 discloses a further machine tool in which the spindle head runs horizontally, but the tools in the tool magazine are aligned in the vertical axis. The transfer position on the tool magazine is located above and behind the working position. The positions are located, however, with their respective axial alignments in a common vertical plane. A gripper arm pair is provided to convey tool holders between the two positions. The gripper arm pair can be pivoted as a whole, by means of a corresponding pivot unit, about an axis that runs obliquely to the axes of the positions, but lies in the vertical plane defined by those axes. The two gripper arms of the gripper arm pair are individually mounted, in opposite directions, on the pivot unit, specifically relative to an axis that extends perpendicular to the pivot axis of the pivot unit. The gripper arms each have a bent configuration.

The movement path of the two pivot arms is pivotingly symmetrical, so that tool holders can therefore be transported back and forth between the transfer position and the working position, although the orientation of the tool holders changes by 90 degrees during this conveying operation. The locus curves of the tool holders extend in the regions between the positions, at a lateral distance from the vertical plane.

In machine tools of the kind in question here, particularly in "machining centers" which preferably perform drilling and milling operations on workpieces, an effort is made to achieve a structure which is as compact and resistant to malfunction as possible. In this connection it is desirable, whenever possible, to encapsulate the working space of the machine tool as completely as possible so that flying chips of material and splashes of drilling fluid do not get onto the other parts of the machine tool, for example into the tool magazine: the poorer the encapsulation of the working space, the greater the danger that chips will settle on the clamping tapers of the tool holders. This can result in damage when a tool holder is clamped into the spindle of the machine tool. With poorly encapsulated machine tools it is also possible only with difficulty to get access, especially manually, to the tool magazine while the machine tool is in operation. This is occasionally desirable, however, in order to load a new set of tools for the next machining operation on the rear side of the machine tool.

The underlying object of the invention is therefore to develop a machine tool of the aforesaid type in such a way that the most compact possible configuration results, in which good encapsulation of the working space is possible but at the same time the movement sequences during tool changing can be designed with the least possible protrusion and therefore with the greatest possible saving of space.

According to the invention, this object is achieved by the fact that the transfer position and the working position lie in a common vertical plane; that the transfer position is located in the region of the front side, facing toward the spindle head, of the traveling column; that the tool magazine extends from a rear side of the traveling column, through a tunnel in the traveling column, to the transfer position; and that in the region between the positions, the locus curves run at a lateral distance from the vertical plane.

The underlying object of the invention is completely achieved in this manner.

Because of the relocation (known in the art) of the tool magazine to the rear side of the traveling column, firstly the tool holders stored in the magazine are removed a considerable distance from the working space. It is therefore possible, for example, to install a suitable covering on both sides of the traveling column, in particular a partition that can be displaced in the manner of an accordion, so that the rear side of the traveling column is well protected with respect to the working space.

But the invention additionally utilizes the feature of relocating into the traveling column itself the transition from the rear side of the traveling column where the tool holders are stored, to the front side of the traveling column where the working position is located. This has the advantage that a separate passage in the partition does not need to be produced. Instead, the traveling column itself is used as the transition, by creating a tunnel therein. In contrast to conventional machines, therefore, the region above the traveling column can also be encapsulated from front to back.

Since, in contrast to conventional machines, the transfer position for the tool holders has thus moved to a point behind the working position, i.e. the spindle receptacle, the invention, by means of an extremely simple movement sequence for the tool holders, achieves a very simple and rapid tool change within the common vertical plane of the two positions.

In a first preferred exemplary embodiment of the invention, the transfer position is located above the working position.

The advantage of this feature is that the necessary design changes to the traveling column involve only the upper part of the traveling column, in which no drives or the like are located. In addition, it is also possible in this manner to couple the tool magazine to the spindle head, as will be described below.

Alternatively, however, the transfer position can also be arranged below the working position.

The advantage of this feature is to reduce the height of the construction.

In a preferred embodiment of the invention, the tool magazine comprises a storage area arranged on the rear side of the traveling column, as well as a transport device extending through the tunnel.

The advantage of this feature is that conventional continuous magazines with a circulating conveyor device for the tool holders can be used. The tool holders circulate on a continuous oval track, which can be achieved with two simple transport rollers around which the continuous conveyor circulates. Transfer of the tool holders to the transfer position, however, is accomplished by the transport device, which can therefore be designed for the individual circumstances of the traveling column. The transport device can moreover perform additional storage functions if it is also designed as a continuous conveyor.

In another group of exemplary embodiments the storage area is joined to the spindle head.

The advantage of this feature is that a variable tool changing plane results, since the tool holders can now be changed with the vertically moveable spindle head in any vertical position.

In one group of preferred exemplary embodiments, however, the storage area is joined to the traveling column.

The advantage of this feature is that the great weight of the tool magazine can be moved with the usually very solidly designed traveling column. In addition, rigid attachment of the storage area to the traveling column has the advantage that the tunnel through the traveling column requires only relatively small dimensions.

In a further group of preferred exemplary embodiments of the invention, the gripper arms are configured as articulated parallelograms, the parallel rods of which are pivoted in a vertical plane on pivot elements that can pivot about first, horizontal axes, the pivot elements being mounted on the spindle head so as to pivot about second, vertical axes.

The advantage of this feature is that a particularly simple movement path results, in which the orientation of the tool holders in particular can be kept constant in a very simple manner.

In these exemplary embodiments of the invention it is preferred if the gripper arms can pivot by means of a linkage about the first and second axes, such that the linkage:

a) Is configured symmetrically with respect to the vertical plane;

b) Can pivot about an axis lying in the vertical plane; and c) Comprises two winglike linkage parts that on the one hand can pivot about fourth axes that are arranged on either side of the vertical plane in a plane running perpendicular thereto and can pivot together about the third axis; and on the other hand are connected, by means of a linkage arrangement defined by three mutually perpendicular axes, to one of the parallel rods.

The advantage of this feature is that the entire pivoting movement of both gripper arms can be produced by an extremely simple drive: all that is necessary is to pivot the linkage about the third axis, through a specific angle in one or the other direction, for each tool changing operation. This simple rotation/pivot movement is converted by the above-described linkage into movements of the gripper arms; the latter are first swung upward or downward out of a vertical or horizontal position, move laterally apart from one another, and lastly reach the respective opposite horizontal or vertical end positions.

In this instance, a particularly good effect is achieved if the linkage acts on lever arms that are connected with the one parallel rod.

The advantage of this feature is that with relatively small movement forces and with a relatively low torque for the linkage, the pivoting movement can be produced by a corresponding lengthening of the paths.

In variants of the aforesaid exemplary embodiments, the articulated arrangements consist of either three individual articulations or one ball joint, depending on which is more favorable in the individual case.

Further advantages are evident from the description and the appended drawings. It is understood that the features mentioned above and those yet to be explained below can be used not only in the particular combination indicated, but also in other combinations or in isolation, without leaving the context of the present invention.

Exemplary embodiments of the invention are depicted in the drawings and will be described in more detail in the description below. In the drawings.

Figure 1:
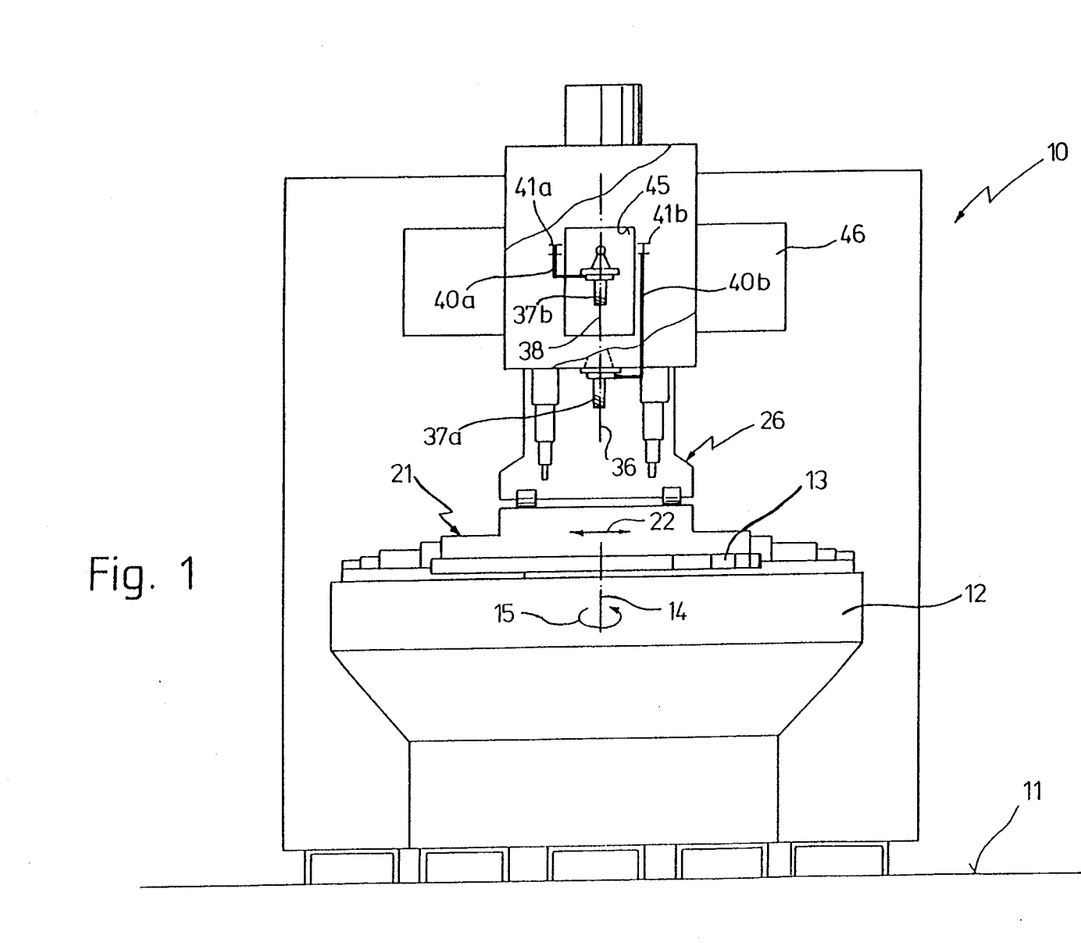
FIG. 1 shows a front view, partly cut away, of an exemplary embodiment of a machine tool according to the invention.
Figure 2:
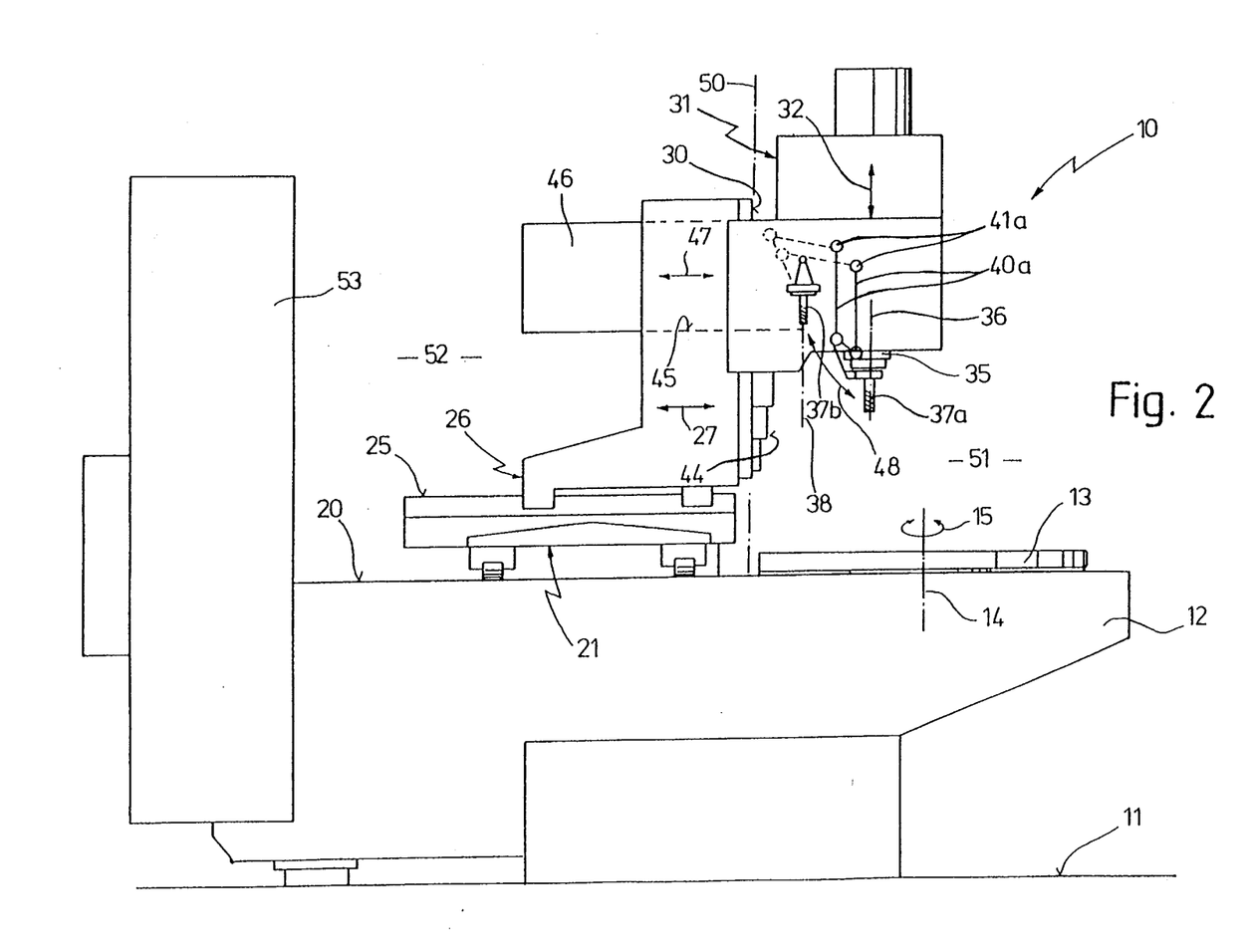
FIG. 2 shows a side view of the machine tool shown in FIG. 1.

In FIGS. 1 and 2, 10 refers to the entirety of a machine tool. The machine tool 10 is a "machining center," i.e. a machine tool that performs preferably drilling and milling operations on workpieces, under the numerical control of a control unit. For the various machining steps in the machining center, predefined tools are selected from a tool magazine and clamped into the spindle. Once the machining step is complete the tool is changed, and the next machining step is performed with the next tool.

The machine tool 10 stands on a foundation 11 and comprises a workpiece table 12, which in the exemplary embodiment depicted is stationary. Machining centers with workpiece tables that can move in space are also known, however.

A workpiece changer 13 is located on the workpiece table 12. The workpiece changer 13 consists substantially of a table that can rotate about a vertical axis 14, as indicated by an arrow 15. The workpiece changer 13 rotates through 180 degrees at the beginning and end of each machining operation, so that on one side of the workpiece changer 13 the previously machined workpiece can be removed and a new, unprocessed workpiece can be clamped in place while the previously clamped workpiece is being machined on the opposite side of the workpiece changer 13.

In the machine tool 10, the tools can be moved relative to the workpiece along three Cartesian coordinates.

Provided for this purpose is firstly a first support 20, joined to the workpiece table 12, on which a first carriage 21 can be displaced in the lengthwise direction as indicated by an arrow 22. This displacement axis is called the X axis.

The first carriage 21 carries a second support 25 with a guide for a second carriage 26, which is also called the traveling column. The second carriage 26 can be displaced in a direction 27 perpendicular to the displacement direction of the first carriage 21. The displacement axis of the second carriage or traveling column 26 is called the Y axis.

The X axis and Y axis constitute the horizontal main axes of the machine tool 10.

Located on the traveling column 26 is a third support 30 for a third carriage that carries the spindle head 31. The displacement axis of the spindle head 31 runs vertically, and is called the Z axis. It is indicated in FIGS. 1 and 2 with an arrow 32. The Z axis constitutes the third, vertical main axis of the machine tool 10.

Located in the spindle head 31 is a spindle 35, the axis 36 of which, as mentioned, runs vertically and thus defines a working position for tools.

The actual tools are held in tool holders, of which the one currently located, in the state depicted, in the spindle 35 is designated 37a in FIGS. 1 and 2.

37b designates a second tool holder that is located above and behind the working position 36, specifically in a transfer position 38. The tool holders 37a and 37b are both oriented in the vertical axis. Gripper arms 40a, 40b, which are articulated at both sides of the spindle head 31, serve to convey the tool holders 37a, 37b between the working position 36 and transfer position 38. The articulated nature of the gripper arms 40a, 40b is indicated in FIGS. 1 and 2 by axes 41a, 41b. It must be expressly emphasized at this point, however, that the depicted axes 41a, 41b are understood to be only extremely schematic, since much more complicated articulated arrangements are used for the gripper arms 40a, 40b in the machine tool 10 according to the invention, as will be described below in detail.

The transfer position 38 is located at a front side 44 of the traveling column 26, as is clearly evident from FIG. 2.

The front side 44 of the traveling column 26 simultaneously constitutes the mouth of a tunnel 45 that passes through the traveling column 26 from the front side 44 to the rear side. In the depiction of FIG. 1, the front view is cut away sufficiently to depict the tunnel 45 more clearly. The mouth of the tunnel 45 is located behind the spindle 45, which in FIG. 1 was omitted in the cutaway depiction for the sake of clarity.

Located on the rear side is a storage area 46 of a tool magazine. The storage area 46 is connected to a transport device (indicated only with an arrow 47) in order to bring individual tool holders from the storage area 46 to the transfer position 38 or vice versa. The storage area 46 and the transport device 47 therefore together constitute the tool magazine.

In the exemplary embodiment of FIGS. 1 and 2, the storage area 46 is joined to the spindle head 31 and is therefore displaced together with it along all three main axes X, Y, and Z, as is known in the art by the technical term "variable tool changing plane."

In order to convey the tool holders 37a, 37b in the manner described, a tool change between position 36 and 38 is required, as indicated in FIG. 2 with an arrow 48. This tool change will be explained below in further detail.

Lastly, 50 in FIG. 2 indicates that a partition, which allows complete encapsulation of the front region of the machine tool 10 from the rear region, can be provided approximately in the plane of the front side 44 of the traveling column 26. The partition 50 can, in particular, separate the working space 51 of the tools from the rear space 52 and the accessories located there, for example the equipment boxes 53 and the like. In the arrangement depicted in FIG. 2, the storage area 46 of the tool magazine is also clearly separated from the working space 51. In this case the only opening in the partition 50 is constituted by the traveling column 26, while separate openings for tool changing are not required, since the latter occurs through the tunnel 45 in the traveling column 26.

Figure 3:
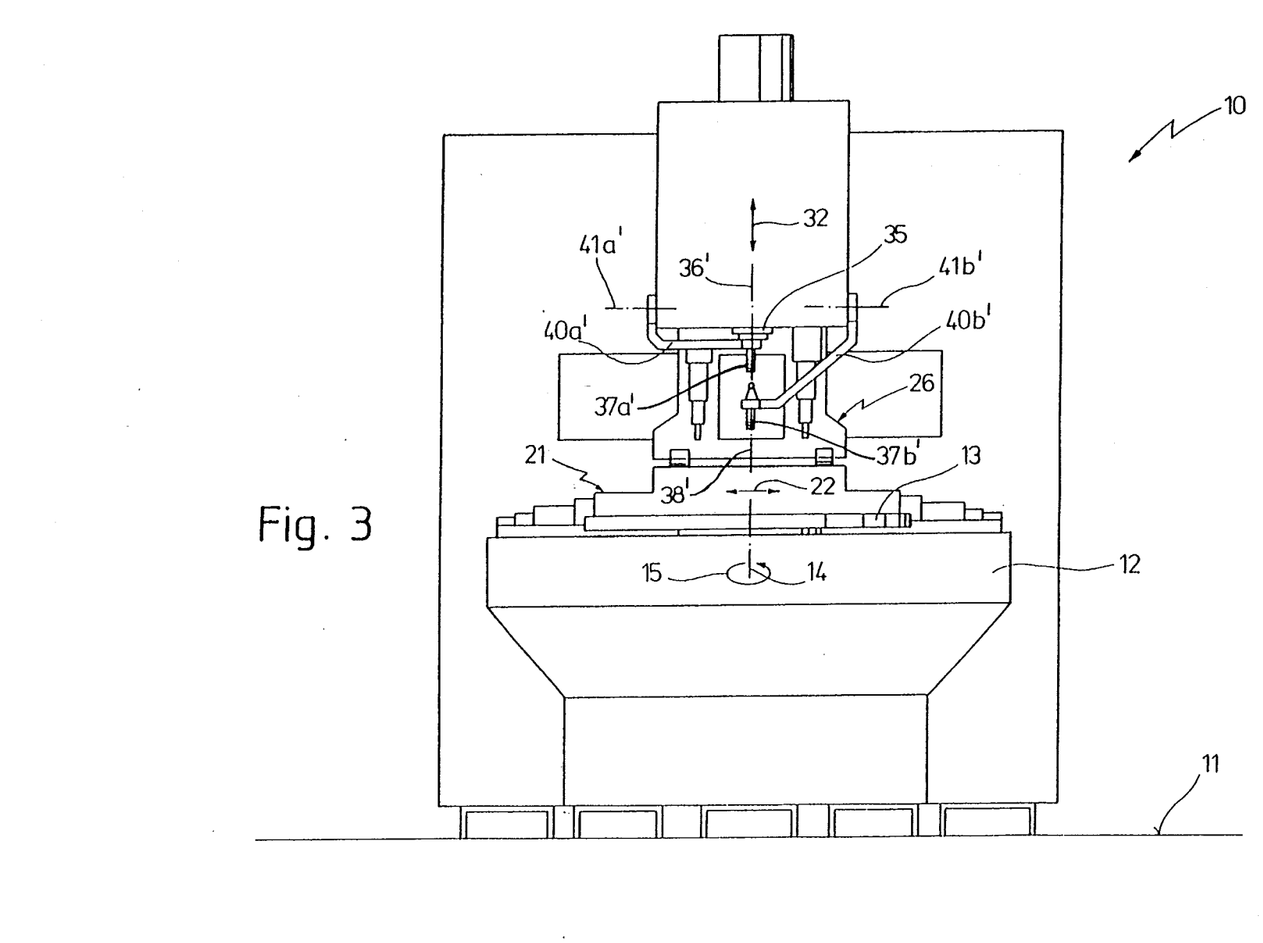
FIG. 3 shows a front view similar to FIG. 1, but for a slightly different exemplary embodiment.
Figure 4:
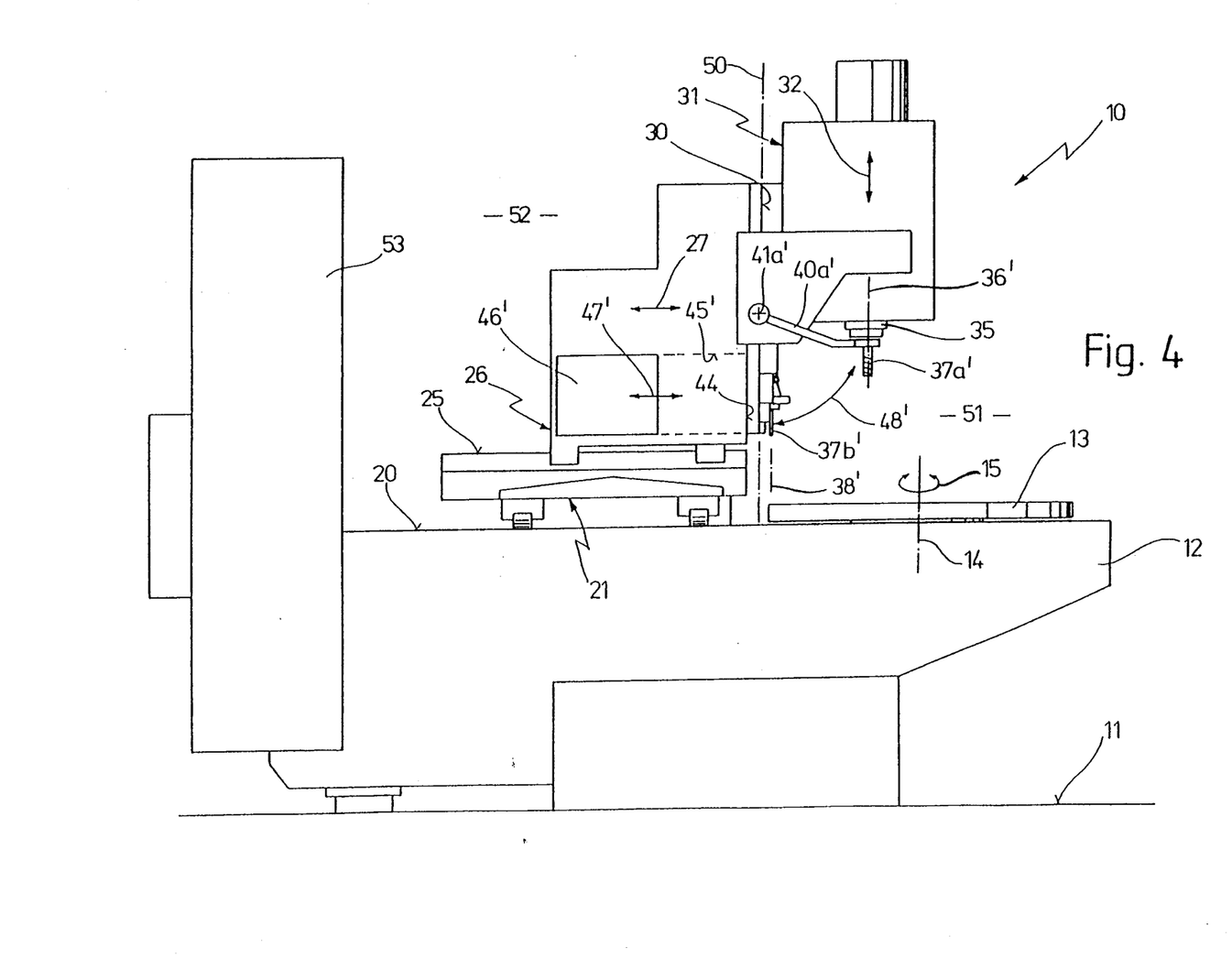
FIG. 4 shows a side view similar to FIG. 2, but for the exemplary embodiment according to FIG. 3.

FIGS. 3 and 4 depict a slightly different exemplary embodiment that is largely similar to that of FIGS. 1 and 2. Identical elements are hence again labeled with the same reference numbers. Where discrepancies exist, comparable reference numbers have an apostrophe added to them.

The essential difference in the machine tool according to FIGS. 3 and 4 consists in the fact that the transfer position 38 is located below the working position 36. The tunnel 45 therefore passes through the traveling column 26 in a lower position, as is clearly evident in FIG. 4.

The exemplary embodiment according to FIGS. 3 and 4 is particularly suitable for those machine tools in which the tool magazine is rigidly joined to the traveling column.

The configuration and operation of the tool changer, in particular the gripper arms 40a' and 40b', are identical to those of FIGS. 1 and 2; gripper arms 40a' and 40b' simply need to be mounted in pivotingly symmetrical fashion as compared with the gripper arms 40a and 40b, as will become evident below.

Figure 5:
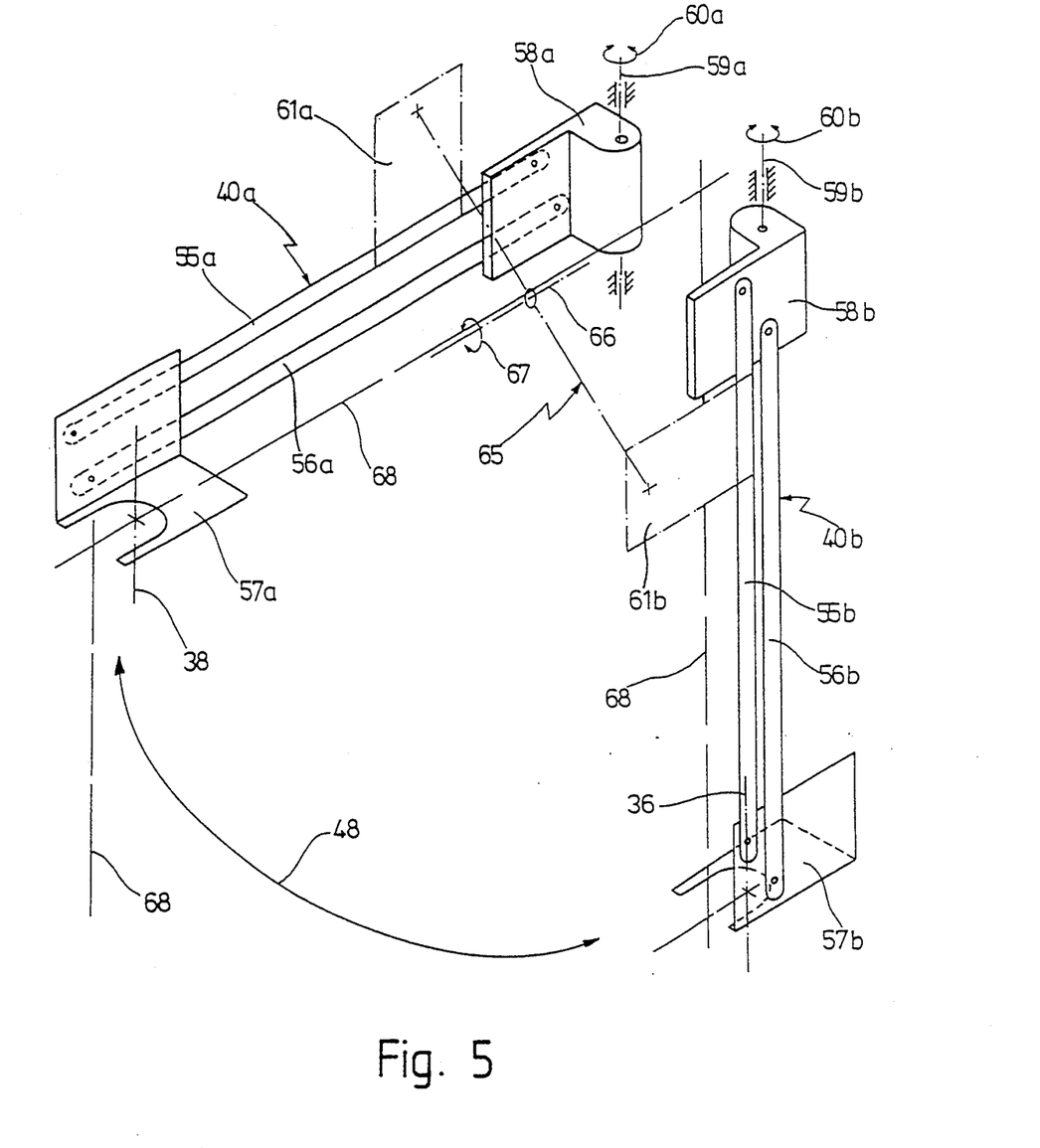
FIG. 5 shows a schematic depiction of the tool changer used in the machine tool according to FIGS. 1 and 2, in a first working position.
Figure 6:
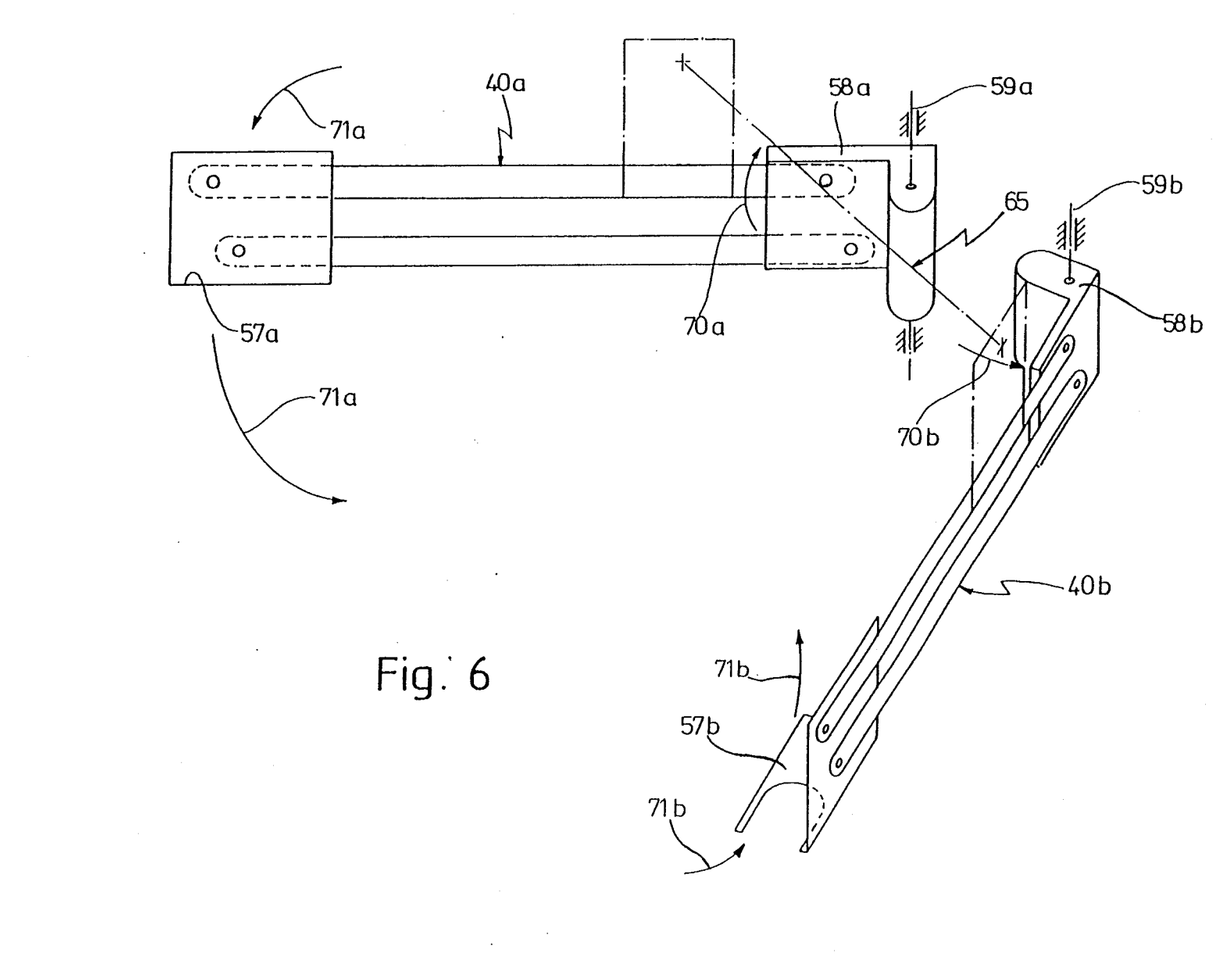
FIG. 6 shows the tool changer according to FIG. 5 in an intermediate position.
Figure 7:
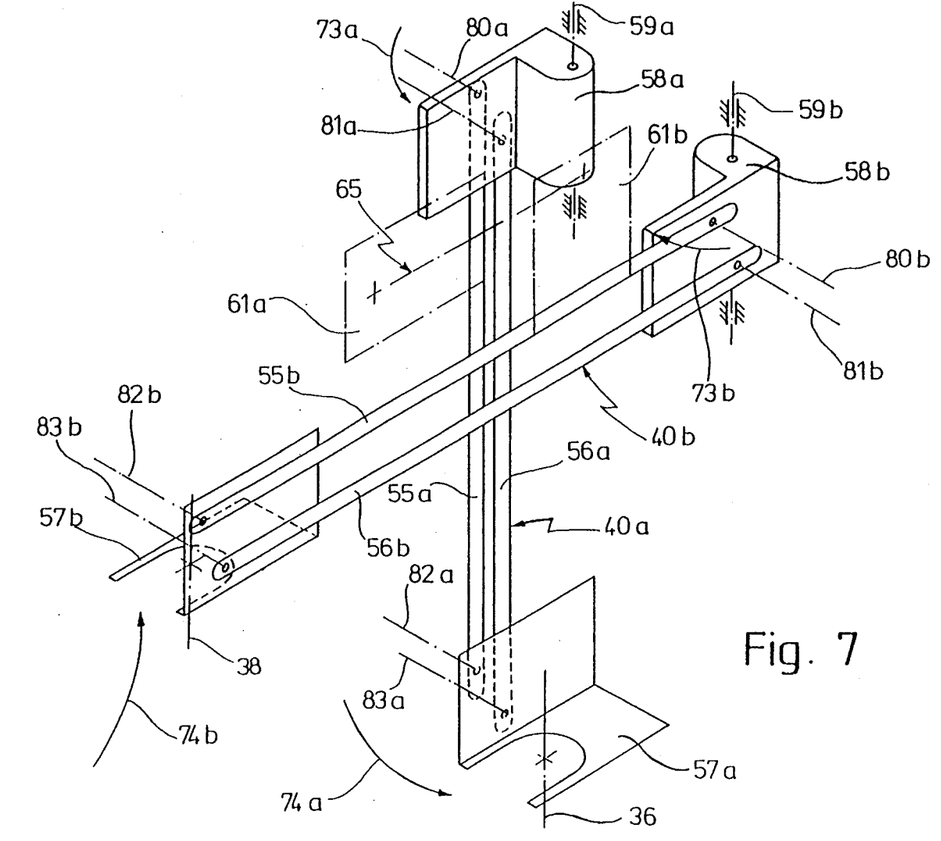
FIG. 7 shows the tool changer according to FIGS. 5 and 6 in a second working position.

In order to accomplish a tool change in the exemplary embodiment according to FIGS. 1 and 2 between positions 36 and 38, a tool changer with the gripper arms 40a, 40, which now will be described in detail, is required:

FIGS. 5 to 7 depict the gripper arms 40a, 40b in further detail.

It is evident that each gripper arm 40a, 40b is configured in principle as an articulated parallelogram. For this purpose, the two gripper arms 40a, 40b have a pair of parallel rods 55a, 56a and 55b, 56b respectively. The rods 55a, 56a, 55b, 56b are each mounted at the front end in a hand 57a and 57b, and at the rear end in a pivot element 58a and 58b. This makes it possible for the gripper arms 40a, 40b to pivot both into a horizontal position and into a vertical position.

The pivot elements 58a, 58b are in turn pivotable about axes 59a, 59b fixed to the spindle, as indicated by arrows 60a, 60b. The axes 59a, 59b extend vertically.

The respective upper and lower rods 55a, 55b of the gripper arms 40a, 40b are each provided with a retainer plate 61a and 61b that concurrently serves as a lever arm: engaging on the retainer plates or lever arms 61a, 61b are the ends of a multiply articulated linkage 65, indicated only extremely schematically in FIGS. 5 to 7, that serves to pivot the gripper arms 40a, 40b.

The linkage 65 can pivot, about an axis 66 fixed to the spindle, by means of a suitable actuation unit, as indicated by an arrow 67. The axis 66 extends horizontally.

Also evident from FIG. 5, as already mentioned, is the fact that the axes of the positions 36, 38 define a common vertical plane that is symbolized in FIG. 5 with dashes 68.

For a tool change from an opposite position into the position drawn in FIGS. 1 and 2, it is then necessary for the receptacles for the tool holders in the hands 57a and 57b to exchange their positions drawn in FIG. 3, so that the gripper arm 40a, still oriented horizontally, then extends vertically as in FIGS. 1 and 2, and the gripper arm 40b, still oriented vertically, then extends horizontally.

For this purpose, the linkage 65, symmetrical relative to the axis 66, is pivoted about the axis 66.

As is evident in FIG. 4, for this purpose the pivot elements 58a and 58b are each pivoted outward about the axes 59a, 59b fixed to the spindle, so that the gripper arms 40a, 40b are spread apart from one another. The left arm 40a in FIGS. 5 and 6 thus pivots outward and downward, as indicated by arrows 71a in FIG. 6. The right arm 40b in FIGS. 5 and 6 also pivots outward, but also simultaneously upward, as indicated by arrows 71b in FIG. 6.

Because the gripper arms 40a, 40b are spread apart from one another, a collision between the tool holders (not depicted) held in the hands 57a and 57b cannot occur in the center position indicated in FIG. 6.

To reach the working position according to FIGS. 1 and 2 and 7, which is opposite to the working position in FIG. 5, the pivot elements 58a and 58b are again pivoted with respect to one another as indicated by arrows 73a, 73b in FIG. 7. At the end of the tool change the pivot elements 58a and 58b thus again assume their original position.

However, the gripper arm 40a has thereby been pivoted farther downward and additionally inward, as indicated by an arrow 74a, while the gripper arm 40b has been pivoted upward and back inward, as indicated by an arrow 74b. The hands 57a, 57b have now exchanged positions with respect to their original position according to FIG. 5. Since the hands 57a and 57b each protrude inward, at the end of each tool change the tool holder receptacles are respectively in positions 36 and 38.

The linkage 65 used to pivot the gripper arms 40a and 40b will now be explained with reference to FIGS. 8 and 9:

The explain the movement sequence, first the pivot axes for the two articulated parallelograms will be defined: in FIGS. 8 and 9, 80a, 81a, 82a, and 83a denote the four pivot axes of the gripper arm 40a, and 80b, 81b, 82b, and 83b denote the corresponding pivot axes of the articulated parallelogram in the gripper arm 40b.

Located at the lever arms or retainer plates 61a and 61b, preferably at a distance from the associated rod 55a or 55b, is the respective attachment point for the free ends of the linkage 65.

The linkage 65 consists at its outer ends of a first articulated part 85a or 85b, which is rigidly joined to the lever arm or retainer plate 61 or 61b. The first articulated part 85a or 85b is pivotedly joined via a first axis 86a or 86b to a second articulated part 87a or 87b. The second articulated part 87a or 87b is then articulatedly joined to a third articulated part 88a or 88b via a second axis 89a or 89b. The third articulated part 88a or 88b is in turn pivotedly joined to a fourth articulated part 91a or 91b via a third axis 92a or 92b.

The three axes 86a or 86b, 89a or 89b, and 92a or 92b are in each case perpendicular to one another.

The fourth articulated parts 91a or 91b are each wing-shaped. They are in turn pivotedly joined to a fifth articulated part 94a or 94b via a fourth axis 95a or 95b.

The fifth articulated parts 94a and 94b are rigidly joined to one another, and preferably are configured integrally with one another.

The fourth axes 95a and 95b, which run parallel to one another, extend at right angles to the third axes 92a and 92b. They lie in a plane that runs at right angles to the vertical plane 68. The fifth articulated parts 94a and 94b are nonrotatably joined to a drive shaft 97 that extends along the axis 66 fixed to the spindle. When the drive shaft 97 is turned, as indicated by arrows 67, the fourth axes 95a and 95b are rotated in the aforementioned plane that extends at a right angle to the vertical plane 68 and also vertically.

Figure 8:
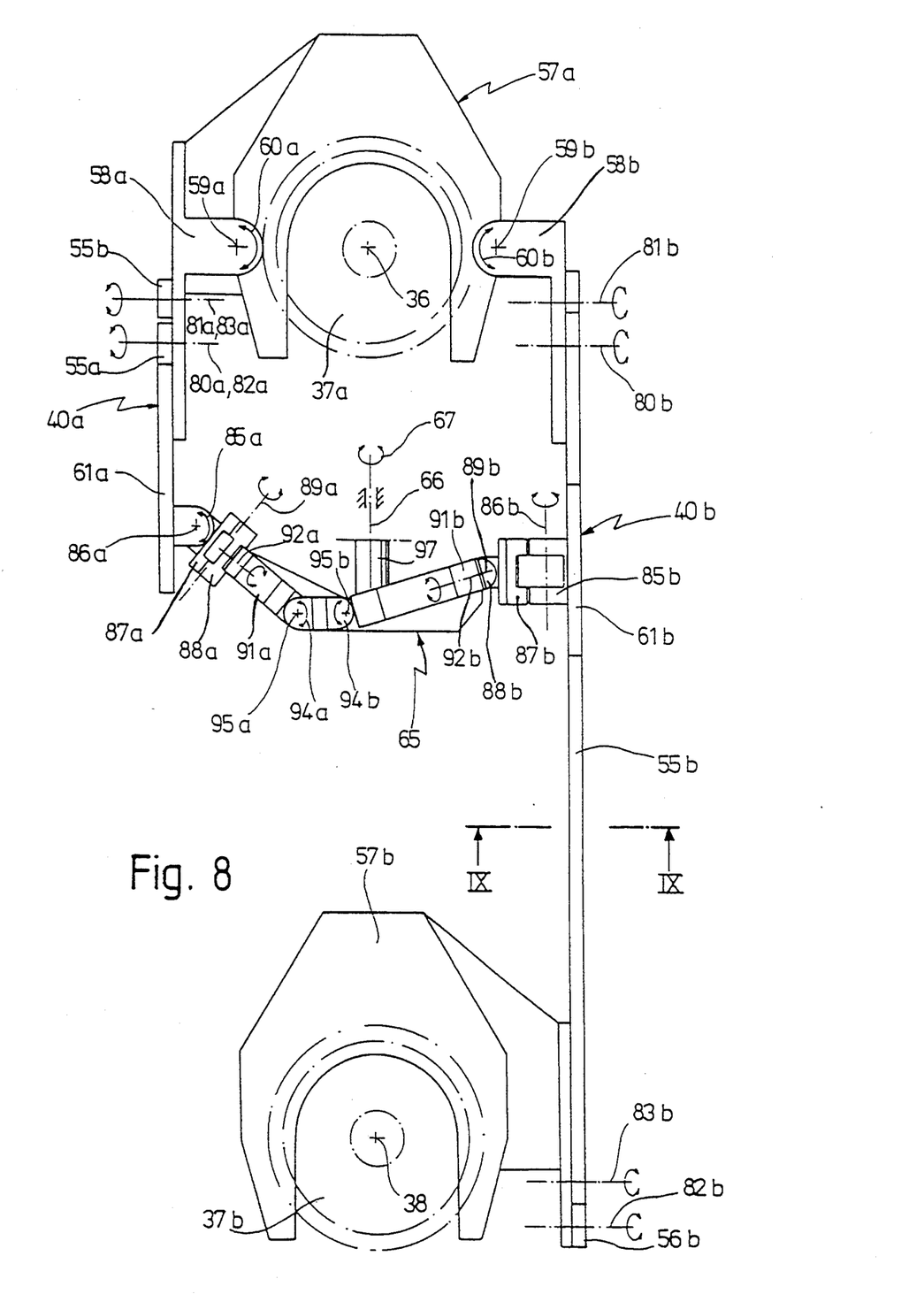
FIG. 8 shows the tool changer in the position according to FIG. 7 in a top view, at enlarged scale and with further details.
Figures 9, 9A:
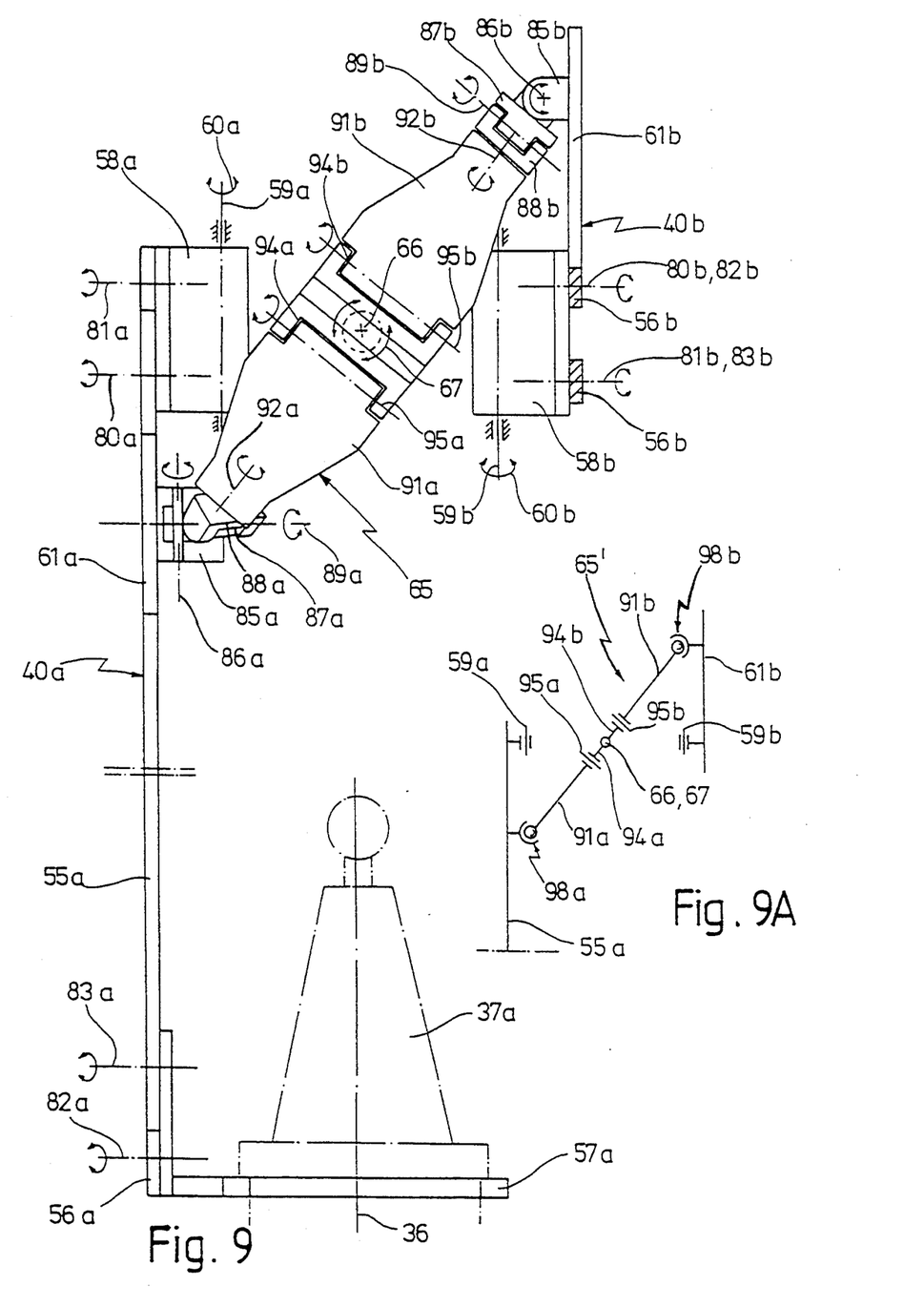
FIG. 9 shows the tool changer according to FIG. 8 in a view along line IX—IX of FIG. 8.
FIG. 9A shows, in an extremely simplified depiction, the tool changer according to FIG. 9, but with a slightly different configuration.

As may be seen from FIG. 8 and 9, in this operating position the winglike fourth articulated parts 91a and 91b both extend in an angled manner to the rear. In addition, they are set obliquely to the horizontal, as is clearly evident from FIG. 9. If the drive shaft 97 of the linkage 65, running in the axis 66, is then rotated, it is easy to see that the winglike fourth articulated parts 91a and 91b are pivoted forward and thus, by means of the articulated arrangement formed by the three axes 86/89/92, the gripper arms 40a and 40b are spread outward (cf. FIG. 6). In the opposite end position, on the other hand, the winglike fourth articulated parts 91a and 91b pivot to the rear, so that the two gripper arms 40a and 40b again extend parallel to one another and only a position symmetrical with respect to FIGS. 8 and 9 results.

The result of the articulation of the winglike fourth articulated parts 91a and 91b in the fourth axes 95a and 95b on the one hand, and the articulated arrangement defined by the three axes 86/89/92, is that a torque transfer is possible from the drive shaft 97 to the gripper arms 40a and 40b, and the movement sequence previously described takes place.

In the process, the articulated parallelograms pivot, in a manner known in the art, about the previously defined axes 80 to 83 so that the orientation of the tool holders 37a and 37b remains aligned with the vertical axis.

The fact that the hands 57a and 57b are arranged at the free ends of the gripper arms 40a and 40b so that their receptacles align with one another in the two end positions also guarantees that in the two end positions of the tool changer, the tool holders are respectively in the working position 36 or transfer position 38.

FIG. 9A depicts, in a depiction similar to FIG. 9 but extremely schematic, a variant of the embodiment of the linkage 65'.

Since the aforementioned three axes 86/89/92 are each perpendicular to one another and form a common articulated arrangement, the latter can also be replaced by a ball joint as depicted by 98a and 98b in FIG. 9A. The arrangement is otherwise unchanged.

Lastly, FIGS. 10 and 11 again indicate, in views similar to FIGS. 8 and 9 respectively, the movement sequence for the tool holders 37a and 37b during a tool change.

Figure 10:
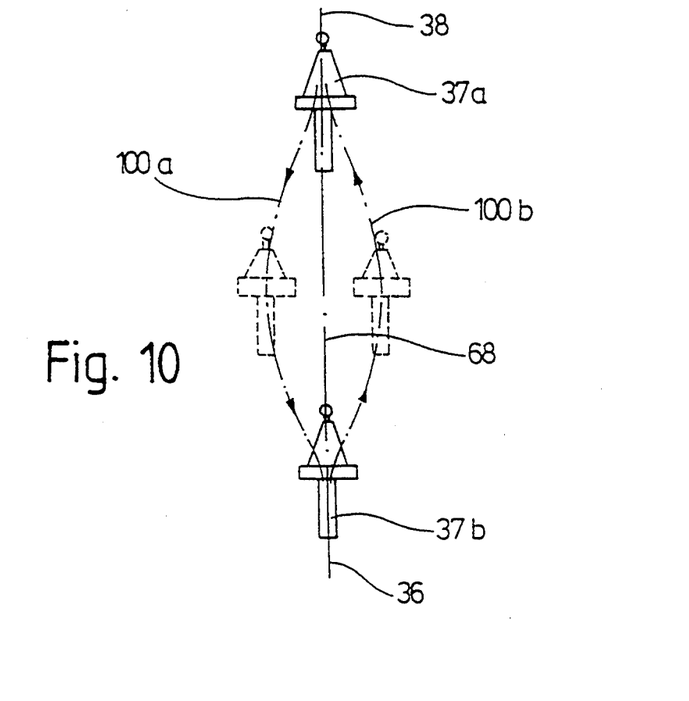
FIG. 10 shows a schematized depiction of the tool changing movement sequence, in a view similar to FIG. 9.
Figure 11:
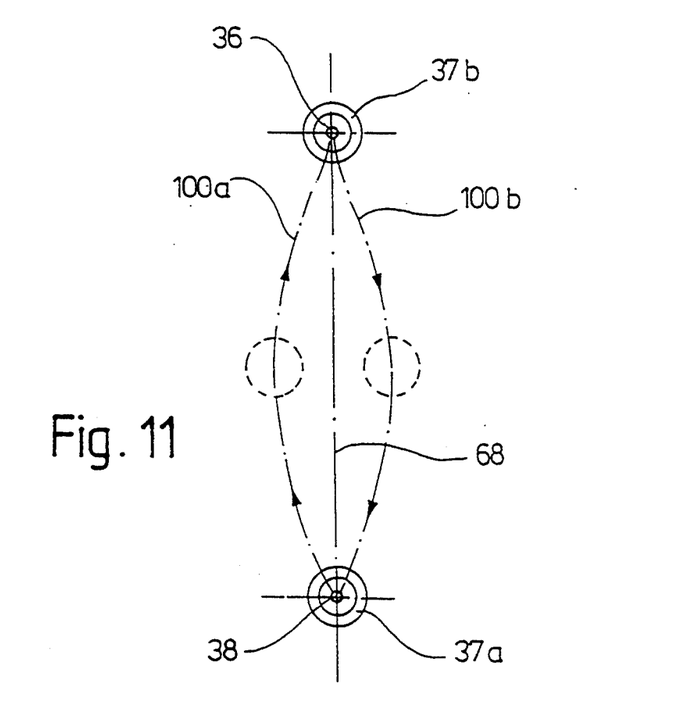
FIG. 11 shows a depiction analogous to FIG. 10, but in a view similar to that of FIG. 8.

It is clearly evident that both in the front view according to FIG. 10 and in the top view according to FIG. 11, the resulting locus curves 100a and 100b each proceed from the common vertical plane 68, then extend at a lateral distance from the vertical plane 68, and lastly join it again. Collisions during the movement sequence are reliably prevented in this manner.

I claim:

1. A machine tool comprising:
    a stationary base defining a main horizontal axis (Y);
    a travelling column guided on said base and adapted to be displaced along said main horizontal axis (Y), said travelling column defining a first vertical axis (Z) and having a front surface, a tunnel being provided in said travelling column opening into said front surface;
    a spindle stock guided on a front surface of said travelling column and adapted to be displaced along said first vertical axis (Z);
    a spindle being rotatable about said vertical axis (Z), said spindle defining a toolholder working position;
    a tool magazine for storing a plurality of tool-holders, said tool magazine extending, partially, through said tunnel, a toolholder transfer position of said tool magazine being provided in front of said tunnel opening, said tool magazine having conveying means for conveying a preselected toolholder from a stored position to said transfer position and from said transfer position to said stored position, respectively; and
    a first and a second gripper arm for interchanging toolholders between said working position and said transfer position while maintaining a vertical orientation of said toolholders, said gripper arms being separately articulated on said spindle stock and having grippers for gripping toolholders, said grippers being displaced in opposite directions along locus curves during said interchanging of said toolholders,
    wherein said transfer position and said working position each lie in a common vertical plane extending perpendicular to said main horizontal axis (Y), said locus curves extending at a lateral distance from said vertical plane between said transfer position and said working position.

2. The machine tool according to claim 1, wherein said transfer position is located above said working position.

3. The machine tool according to claim 1, wherein said transfer position is located below said working position.

4. The machine tool according to claim 1, wherein said tool magazine comprises a storage portion arranged on a rear side of said travelling column, said conveying means extending through said tunnel.

5. The machine tool according to claim 4, wherein said storage portion is connected to said spindle stock.

6. The machine according to claim 4, wherein said storage portion is connected to said travelling column.

7. The machine tool according to claim 1, wherein said gripper arms are configured as articulated parallelograms having parallel rods adapted to be pivoted about first horizontal axes in a vertical plane on pivot elements, said pivot elements being mounted on said spindle stock so as to pivot about second vertical axes.

8. The machine tool according to claim 7, wherein said gripper arms are actuated to pivot about said first and said second axes by means of bar linkage means, said bar linkage means
    being configured symmetrically with respect to said vertical plane;
    being pivotable about a third axis lying in said vertical plane; and
    being adapted to comprise two wing-shaped linkage bars that
        on the one hand can each pivot about fourth axes arranged in parallel to each other on either side of said vertical plane and defining a plane extending perpendicular to said vertical plane, and being, further, jointly pivotable about said third axis, and
        on the other hand are connected to one of said parallel rods of each of said articulated parallelograms via articulation means having three mutually perpendicular axes.

9. The machine tool according to claim 8, wherein said bar linkage acts on lever arms connected with said one parallel rod.

10. The machine tool of claim 8, wherein said articulation means each consist of three individual bearings.

11. The machine tool of claim 8, wherein said articulation means each consists of one ball joint.

* * * * *